United States Patent
Tamura et al.

(10) Patent No.: US 10,215,256 B2
(45) Date of Patent: Feb. 26, 2019

(54) V-RIBBED BELT

(71) Applicant: Mitsuboshi Belting Ltd., Nagata-ku, Kobe-shi, Hyogo (JP)

(72) Inventors: Masashi Tamura, Hyogo (JP); Hisato Ishiguro, Hyogo (JP); Hiroshi Matsumura, Hyogo (JP)

(73) Assignee: Mitsuboshi Belting Ltd. (JP)

( * ) Notice: Subject to any disclaimer, the term of this patent is extended or adjusted under 35 U.S.C. 154(b) by 460 days.

(21) Appl. No.: 14/375,888

(22) PCT Filed: Jan. 31, 2013

(86) PCT No.: PCT/JP2013/052227
§ 371 (c)(1),
(2) Date: Jul. 31, 2014

(87) PCT Pub. No.: WO2013/115321
PCT Pub. Date: Aug. 8, 2013

(65) Prior Publication Data
US 2014/0378256 A1 Dec. 25, 2014

(30) Foreign Application Priority Data

Jan. 31, 2012 (JP) .................. 2012-018630
Jan. 18, 2013 (JP) .................. 2013-007469

(51) Int. Cl.
*F16G 5/08* (2006.01)
*F16G 5/10* (2006.01)
*F16G 5/20* (2006.01)

(52) U.S. Cl.
CPC ............... *F16G 5/08* (2013.01); *F16G 5/10* (2013.01); *F16G 5/20* (2013.01)

(58) Field of Classification Search
USPC .................................. 474/261, 265
See application file for complete search history.

(56) References Cited

U.S. PATENT DOCUMENTS 4,913,690 A 4/1990 Di Giacomo et al.
5,382,198 A 1/1995 Janne
(Continued)

FOREIGN PATENT DOCUMENTS

CN 1106114 A 8/1995
JP A-H02-057745 2/1990
(Continued)

OTHER PUBLICATIONS

Office Action dated May 6, 2015, in Chinese Patent Application No. 201380007555.2.
(Continued)

*Primary Examiner* — Michael R Mansen
*Assistant Examiner* — Mark K Buse
(74) *Attorney, Agent, or Firm* — Wood, Phillips, Katz, Clark & Mortimer

(57) ABSTRACT

The present invention relates to a V-ribbed belt to be wound around plural pulleys and used, including an extension layer that forms a back surface of the V-ribbed belt, a compression layer provided on one surface of the extension layer and having plural ribs extending parallel to each other along a longitudinal direction of the V-ribbed belt, and a load carrying cord embedded between the extension layer and the compression layer along the longitudinal direction of the V-ribbed belt, in which a distance from an outer peripheral portion of the load carrying cord on the rib side to a tip portion of the rib is from 2.0 to 2.6 mm, and a distance from the outer peripheral portion of the load carrying cord on the rib side to a bottom portion of the rib is from 0.3 to 1.2 mm.

6 Claims, 7 Drawing Sheets

(56) References Cited

U.S. PATENT DOCUMENTS

| | | | | |
|---|---|---|---|---|
| 6,419,605 | B1* | 7/2002 | Takahashi | F16G 5/20 474/237 |
| 2011/0086735 | A1* | 4/2011 | Takahashi | C08K 3/04 474/148 |
| 2011/0124453 | A1* | 5/2011 | Nakashima | F16G 1/10 474/139 |

FOREIGN PATENT DOCUMENTS

| | | |
|---|---|---|
| JP | H03-11033 U | 11/1991 |
| JP | 5-50208 | 7/1993 |
| JP | H10-184812 A | 7/1998 |
| JP | H11-6547 A | 1/1999 |
| JP | 2000-304103 A | 11/2000 |
| JP | 2007-232205 A | 9/2007 |
| JP | 2010-112449 A | 5/2010 |
| JP | 2010-276127 A | 12/2010 |
| WO | WO-2009-066492 A1 | 5/2009 |

OTHER PUBLICATIONS

Office Action dated Apr. 30, 2014, in Japanese Patent Application No. 2013-007469.

Final Rejection, dated Dec. 2, 2014 in corresponding Japanese Appln. No. 2013-007469.

Extended European Search Report, dated Nov. 25, 2015 in counterpart European patent application No. 13743990.7.

Office Action dated Jul. 5, 2016 in Chinese Patent Application No. 201380007555.2.

Second Office Action, dated Jan. 5, 2016 in counterpart Chinese patent application No. 201380007555.2.

Notification of Reasons for Refusal, dated Sep. 24, 2015, in corresponding Japanese Patent Appln. No. 2013-007469.

Notification of Reasons for Refusal, drafted Aug. 9, 2016 and dated Aug. 16, 2016 in counterpart Japanese Application No. JP-2015-225723. (translation enclosed).

Office Action dated Jan. 4, 2017, in Chinese Patent Application No. 201380007555.2.

Office Action dated Nov. 30, 2016 in Eurpoean Patent Application No. 13 743 990.7.

Office Action dated Jul. 4, 2017, in Chinese Patent Application No. 201380007555.2.

Office Action dated Sep. 1, 2017, in European Patent Application No. 13 743 990.7.

Notification of Reexamination, dated Sep. 25, 2018, in Chinese Patent Application No. 201380007555.2.

D. Moose, "Mechanical Designs", 16th ed., Mechanical Industry Press, Jun. 2011, p. 497.

* cited by examiner

[FIG. 1]
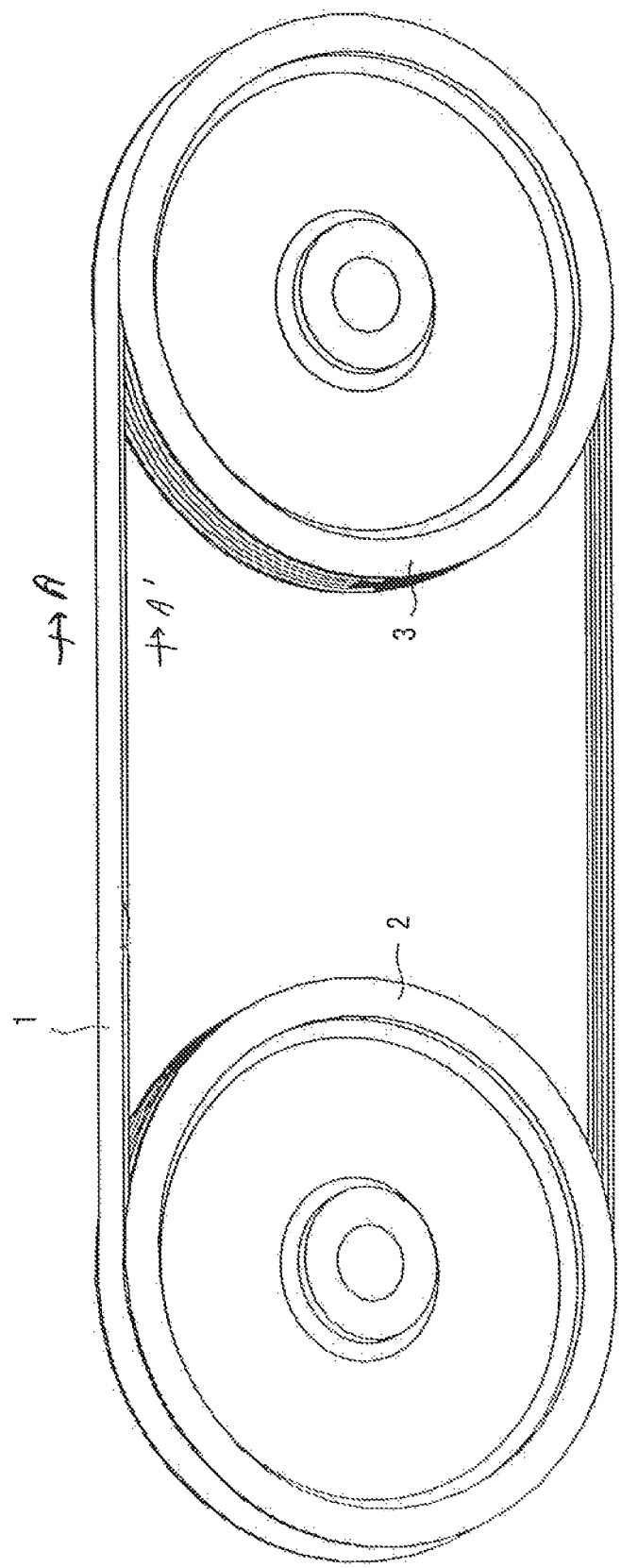

[FIG. 2]
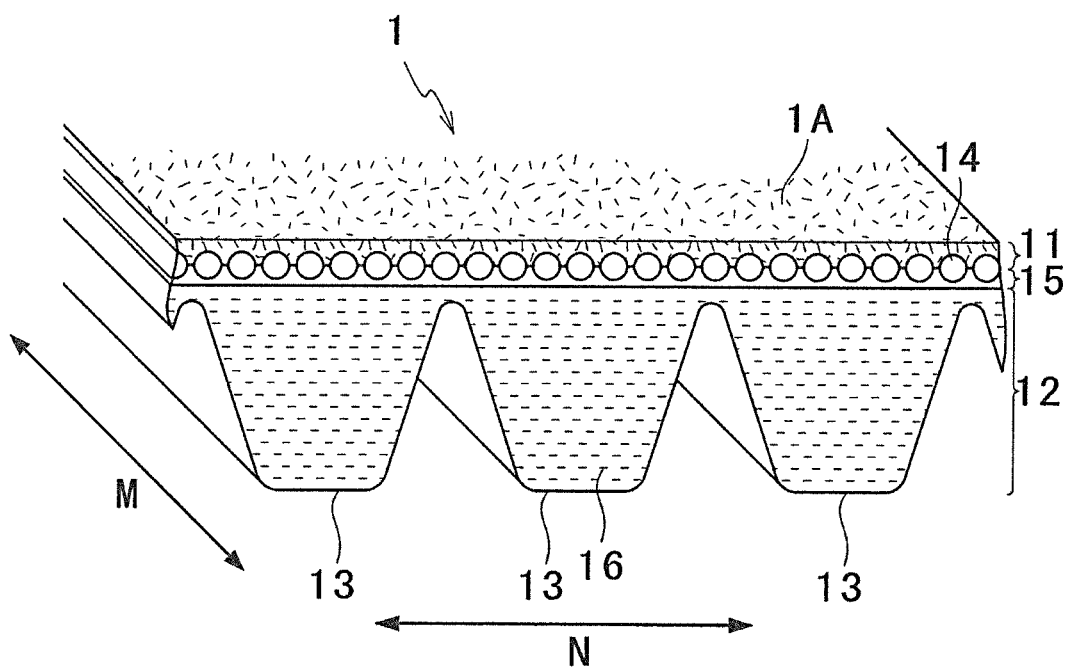

[FIG. 3]
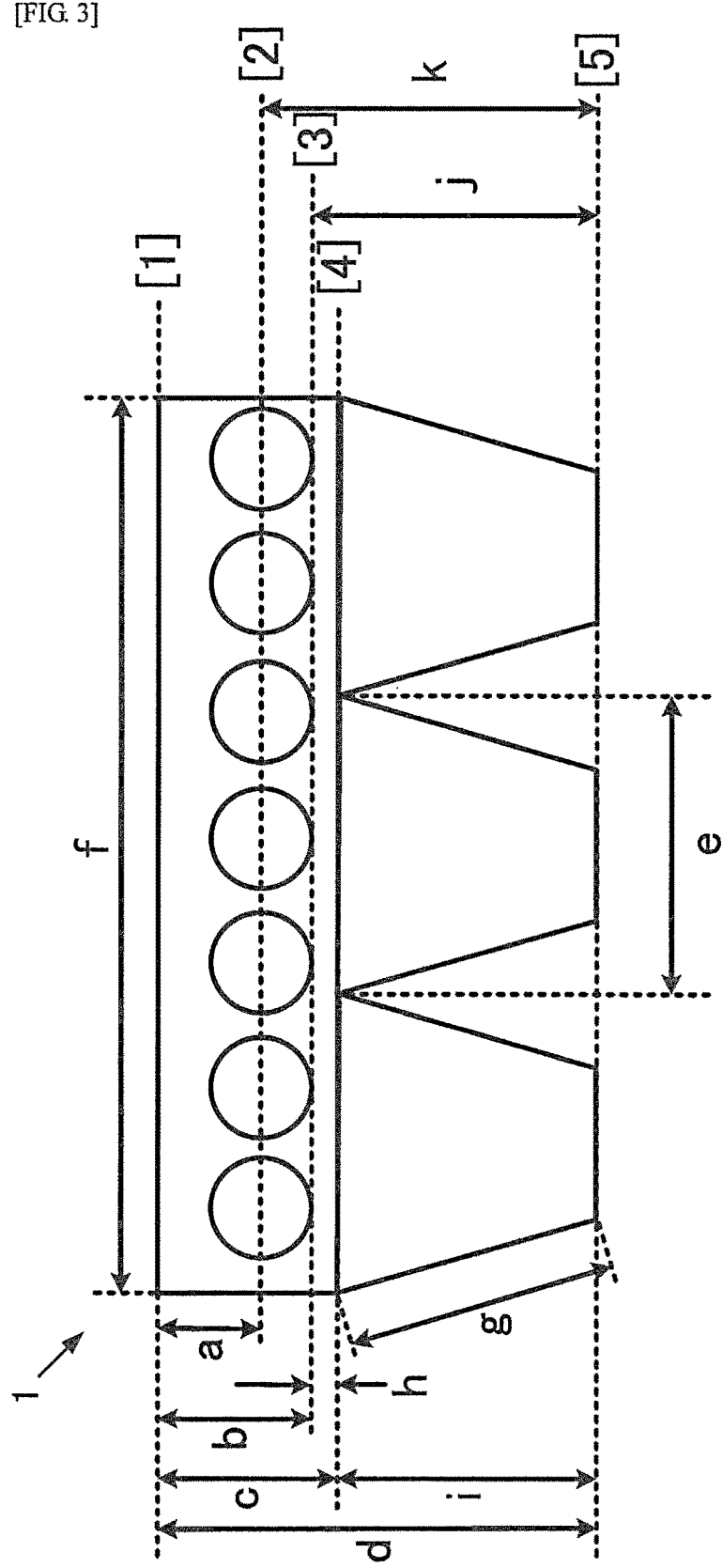

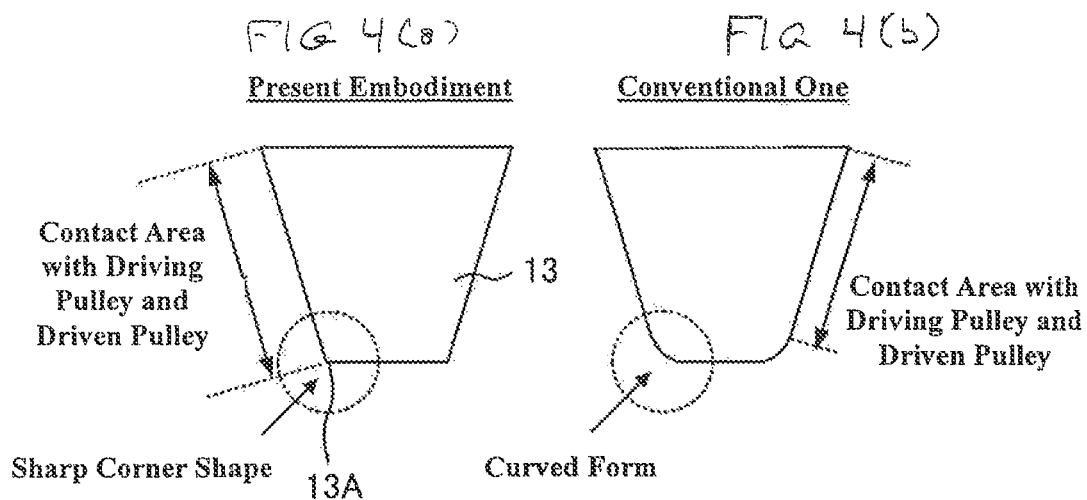
FIG 4(a) Present Embodiment
FIG 4(b) Conventional One
[FIG. 5]
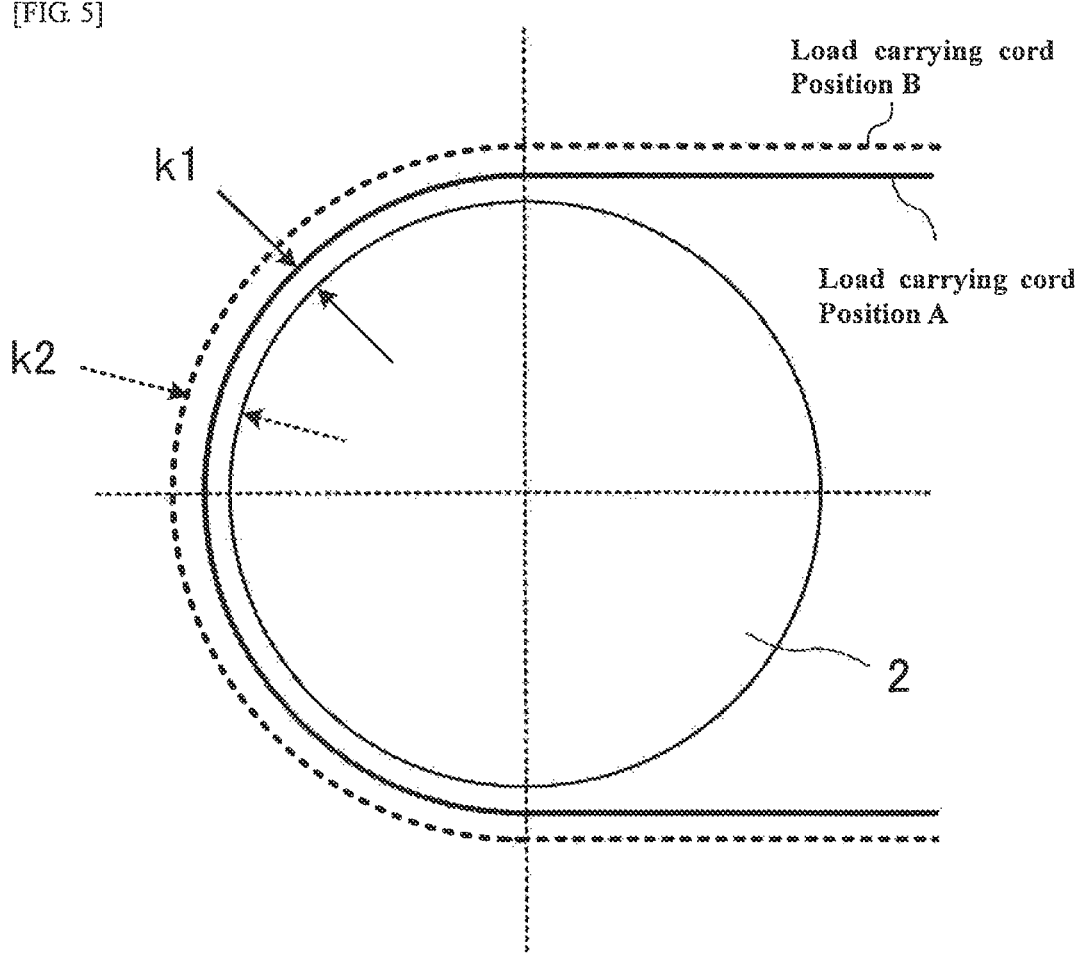

V-Ribbed Belt

2000rpm
Dr.(φ55)    Dn.(φ55)

V-Ribbed Belt

2000rpm
Dr.(φ120)    Dn.(φ120)

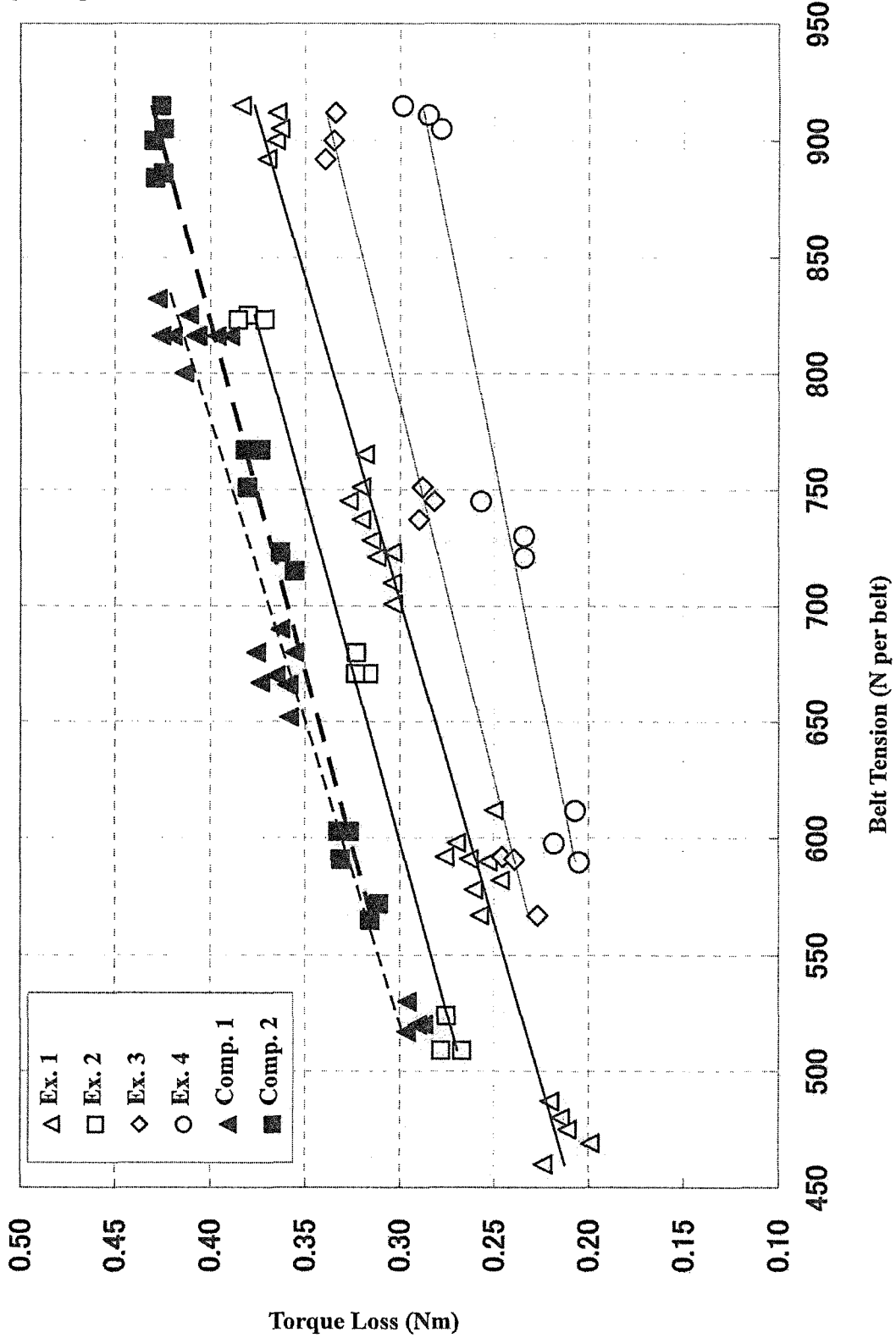
[FIG. 7]

[FIG. 8]
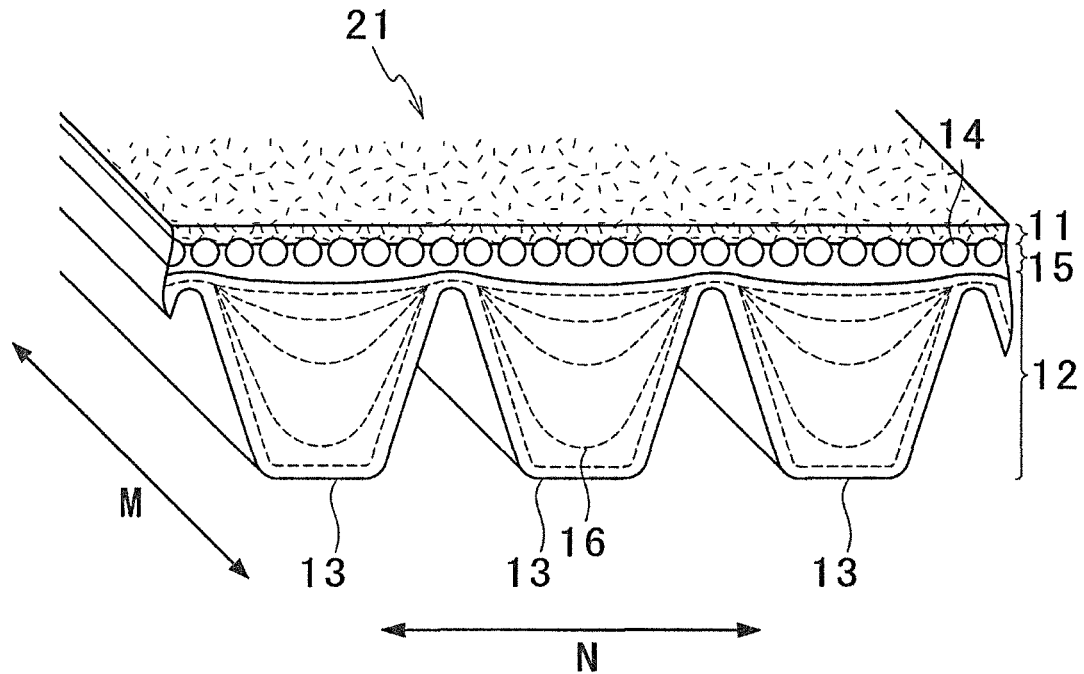
[FIG. 9]
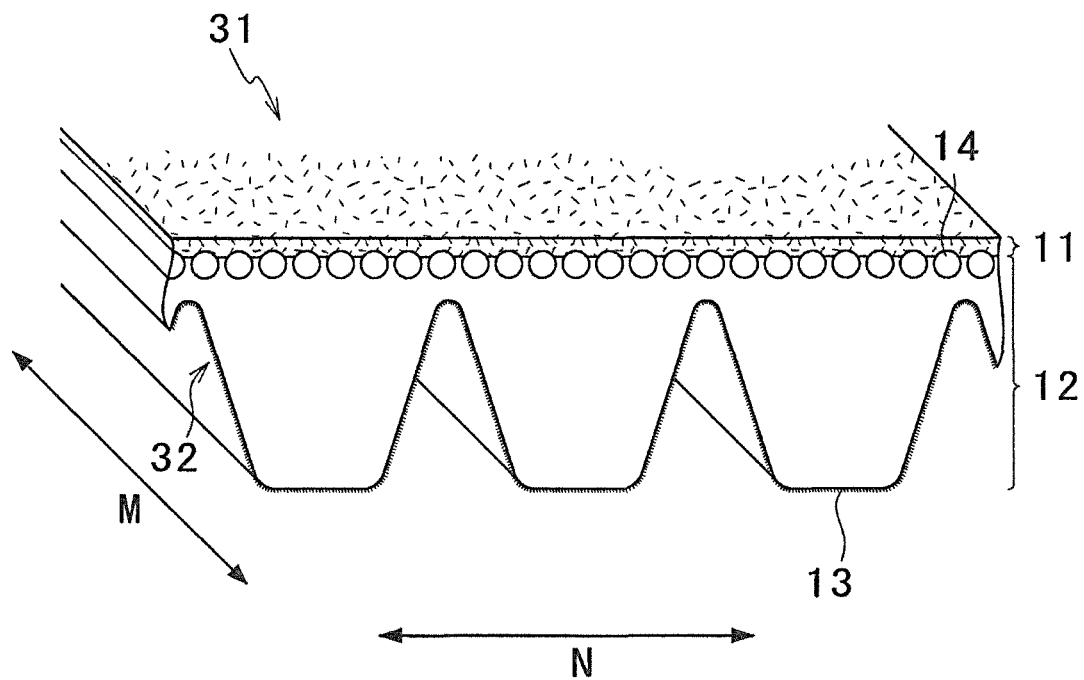

V-RIBBED BELT

TECHNICAL FIELD

The present invention relates to a V-ribbed belt which is used for driving automobile engine auxiliary machine, and in detail, to a V-ribbed belt that can decrease a bending loss (loss) of the V-ribbed belt to reduce a torque loss (fuel consumption) of the engine.

BACKGROUND ART

Power transmission belts which are used for auxiliary machines of automobile engines and the like are changing from a raw-edge belt (V belt) to a V-ribbed belt. In particular, a V-ribbed belt composed of a rubber composition containing an ethylene-α-olefin elastomer (for example, EPDM) as a main component has become the mainstream because not only it is more satisfactory in durability (e.g., heat resistance or cold resistance) than a V-ribbed belt composed of a rubber composition containing a chloroprene rubber (CR) as a main component, but also it does not contain a halogen. Then, it was found that the durability is sufficiently ensured by using EPDM, since then, development for the purpose of enhancing sounding resistance (in particular, sounding at the time of water injection) has been mainly performed (for example, Patent Document 1).

Now, in recent years, in addition to the durability and sounding resistance, in a belt transmission system using a V-ribbed belt, for example, a system for driving automobile engine auxiliary machine, there is a demand for controlling a torque loss of the V-ribbed belt between a driving shaft and a driven shaft, thereby decreasing fuel consumption. In particular, light automobiles or compact automobiles with a small displacement are strictly restricted with respect to mass, space and cost and are limited regarding improvement items of fuel consumption. Therefore, in automobiles of this kind, there is a strong demand for reducing fuel consumption by controlling a torque loss of the V-ribbed belt between a driving shaft and a driven shaft.

For this purpose of reducing fuel consumption, for example, Patent Document 2 discloses a V-ribbed belt in which not only a thickness of the belt is made thin, but also ethylene-2,6-naphthalate is used for a load carrying cord, and a tensile elastic modulus of the belt is set from 14,000 to 17,000 N/rib. According to this, it is described that it becomes possible to make the thickness of the belt thin without reducing the elastic modulus of the belt, bending fatigue resistance of the belt is enhanced by making the thickness thin, and fuel consumption of an engine can be reduced by making a torque loss small.

In addition, Patent Document 3 discloses a V-ribbed belt in which a rubber composition that forms a compression layer contains an ethylene-α-olefin elastomer as a main component, and when dynamic viscoelasticity of the compression layer is measured under conditions at an initial strain of 0.1%, a frequency of 10 Hz, and a strain of 0.5%, a tan δ (loss tangent) at 40° C. is less than 0.150. According to this, it is described that a torque loss can be reduced by making an internal loss (self-heating) of the compressed rubber layer at the time of driving the belt small.

PRIOR ART DOCUMENT

Patent Document

Patent Document 1: JP-A-2007-232205
Patent Document 2: JP-A-H11-6547
Patent Document 3: JP-A-2010-276127

SUMMARY OF THE INVENTION

Problem to be Solved by the Invention

Certainly, as means for reducing a torque loss at the time of belt running, it is effective for making the thickness of the belt thin as in Patent Document 2, or decreasing an internal loss by making the tan δ of the compressed rubber layer small as in Patent Document 3.

However, it may be impossible to sufficiently reduce the torque loss only by such means. That is, since the belt is bent with the load carrying cord, if a position of the load carrying cord to be embedded between a extension layer and a compression layer (i.e., a position in a belt thickness direction) is located on the side of an outer periphery of the belt (back surface), a bending stress of the load carrying cord when the belt winds around a pulley becomes large, and a bending loss increases, whereby the torque loss becomes large. In addition, a thickness of the compression layer or a size of a rib that forms the compression layer (related to a rib height or a rib pitch) is also one of causes of influencing the torque loss. If this is large, a stress (compressive stress) required for bending the compression layer may possibly become high, or even if the tan δ of the rubber composition that forms the compression layer is equal, an internal loss to be caused due to compressive deformation may possibly increase, whereby the torque loss becomes large. Furthermore, a belt width is important, too, and if this width is large, there is a tendency that a bending loss of the belt becomes high, resulting in an increase of the torque loss.

Specifically, in the V-ribbed belt of Patent Document 2, the rib shape is made large in such a manner that a rib pitch is set 3.56 mm and a rib height is set 2.9 mm (see paragraph [0032]), and therefore, even by making the belt thickness thin, the torque loss could not be sufficiently reduced. In addition, in the V-ribbed belt of Patent Document 3, though it is contemplated to reduce the torque loss by making the tan δ of the rubber composition that forms the compression layer small, it could not be said that such is sufficient.

Then, an object of the present invention is to provide a V-ribbed belt capable of not only making a bending loss of the belt to reduce a torque loss of an engine but also keeping a transmission performance of the belt.

Means for Solving the Problem

In order to solve the above-described problem, the present invention provides a V-ribbed belt to be wound around plural pulleys and used, including an extension layer that forms a back surface of the V-ribbed belt, a compression layer which is provided on one surface of the extension layer and has plural ribs extending parallel to each other along a longitudinal direction of the V-ribbed belt, and a load carrying cord which is embedded between the extension layer and the compression layer along the longitudinal direction of the V-ribbed belt, in which a distance from an outer peripheral portion of the load carrying cord on the rib side to a tip portion of the rib is from 2.0 to 2.6 mm, and a distance from the outer peripheral portion of the load carrying cord on the rib side to a bottom portion of the rib is from 0.3 to 1.2 mm.

According to the above-described constitution, by setting the distance from the outer peripheral portion of the load carrying cord on the rib side (hereinafter referred to as "load carrying cord bottom portion) to the tip portion of the rib to the range of from 2.0 to 2.6 mm, a thickness of the compression layer can be made thin, and a torque loss can be reduced by making a stress (compressive stress) and internal loss of the compression layer at the time of winding the V-ribbed belt around the plural pulleys small. In addition, by setting the distance from the load carrying cord bottom portion to the bottom portion of the rib to the range of from 0.3 to 1.2 mm, a torque loss can be reduced by making a bending stress of the load carrying cord at the time of winding the V-ribbed belt around the plural pulleys small (making a bending loss small).

In addition, in the V-ribbed belt according to the present invention, it is preferable to set a width of the above-described rib (rib pitch) to from 2.0 to 3.0 mm and a distance from the bottom portion of the above-described rib to the tip portion of the above-described rib (rib height) to from 1.1 to 1.8 mm, respectively.

According to the above-described constitution, by setting the rib width (rib pitch) and the distance from the bottom portion of the rib to the tip portion of the rib (rib height) to ranges that are smaller than the conventional ranges (those in Patent Document 2), the rib shape that forms the compression layer can be made small, and the torque loss can be reduced by making an internal loss to be caused due to compressive deformation of the rib and a compressive stress of the rib small.

In addition, in the V-ribbed belt according to the present invention, a distance from a center of the above-described load carrying cord to the back surface of the V-ribbed belt is preferably from 0.6 to 1.5 mm.

By setting the distance from the center of the load carrying cord to the back surface of the V-ribbed belt to the range of from 0.6 to 1.5 mm as in the above-described constitution, the torque loss can be reduced by making a tensile stress of the extension layer small.

In addition, in the V-ribbed belt according to the present invention, a diameter of the above-described load carrying cord is preferably from 0.6 to 1.25 mm.

By setting the diameter of the load carrying cord to the range of from 0.6 to 1.25 mm as in the above-described constitution, an increase of the torque loss to be caused due to the matter that a bending stress of the load carrying cord itself becomes excessively large can be prevented from occurring while keeping a strength or tensile stress of the V-ribbed belt itself.

In addition, in the V-ribbed belt according to the present invention, an edge of the tip potion of the above-described rib is preferably a sharp corner shape.

According to the above-described constitution, since the edge of the tip portion of the rib is formed into a sharp corner shape, an area in which the rib comes into contact with grooves of the pulley can be made large, and a transmission performance can be kept.

In addition, in the V-ribbed belt according to the present invention, it is preferable that the above-described extension layer is formed of a rubber composition.

According to the above-described constitution, when the extension layer is formed of a rubber composition, it is easily stretchable as compared with a conventionally used canvas, and a tensile stress of the extension layer at the time when the V-ribbed belt winds around the pulley can be made small, whereby the torque loss can be reduced by making a bending loss of the V-ribbed belt small.

Advantage of the Invention

According to the above-described constitutions, it is possible to provide a V-ribbed belt capable of not only making a bending loss of the belt small to reduce a torque loss of an engine but also keeping a transmission performance of the belt.

BRIEF DESCRIPTION OF THE DRAWINGS

FIG. 1 is a diagrammatic explanatory view of a V-ribbed belt according to an embodiment of the present invention.

FIG. 2 is a cross-sectional view of a V-ribbed belt according to an embodiment of the present invention along line A-A' FIG. 1.

FIG. 3 is a simple cross-sectional view in a width direction of a V-ribbed belt according to an embodiment of the present invention.

FIGS. 4($a$) and 4($b$) are comparative explanatory views between a rib shape of a V-ribbed belt according to an embodiment of the present invention and a rib shape of a conventional V-ribbed belt.

FIG. 5 is an explanatory view regarding a position of a load carrying cord of a V-ribbed belt according to an embodiment of the present invention.

FIG. 7 is a graph showing the measurement results of a torque loss versus a belt tension in V-ribbed belts according to the Examples.

FIG. 8 is a cross-sectional view of a V-ribbed belt according to another embodiment of the present invention.

FIG. 9 is a cross-sectional view of a V-ribbed belt according to another embodiment of the present invention.

MODES FOR CARRYING OUT THE INVENTION

Figure 6A:
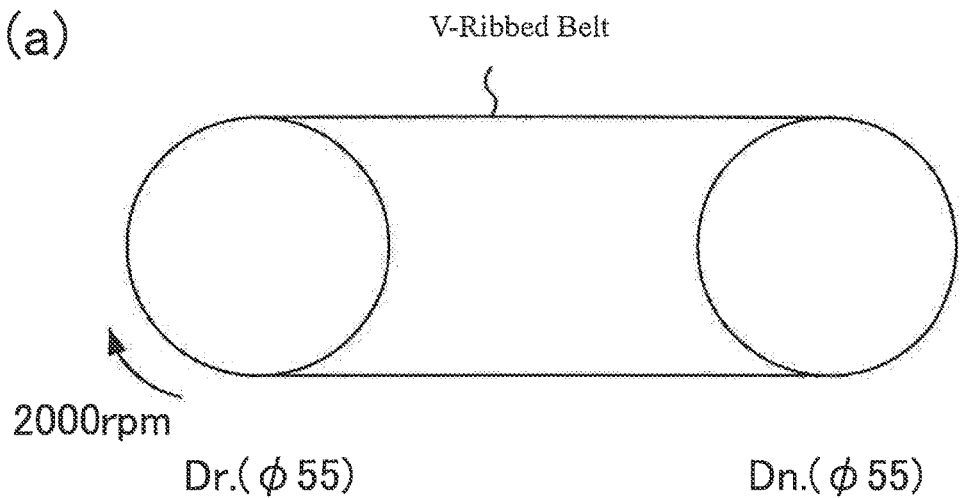
FIGS. 6 ($a$) and ($b$) are explanatory views regarding a measuring method of a torque loss and a measuring method of a transmission performance in V-ribbed belts according to the Examples.

Embodiments of a V-ribbed belt according to the invention of the present application are hereunder described by reference to the accompanying drawings.

As shown in FIG. 1, the V-ribbed belt 1 according to the present embodiment is, for example, wound between a driving pulley 2 and a driven pulley 3 and used in a power transmission system such as a system for driving engine auxiliary machine, etc.

(Constitution of V-Ribbed Belt 1)

As shown in FIG. 2, the V-ribbed belt 1 of the present embodiment is constituted of a rubber composition and includes a extension layer 11 that forms a V-ribbed belt back surface 1A, a compression layer 12 which is provided on one surface of the extension layer 11 and which has plural ribs 13 extending parallel to each other along a V-ribbed belt longitudinal direction M, a load carrying cord 14 which is embedded between the extension layer 11 and the compression layer 12 along the V-ribbed belt longitudinal direction M, and an adhesive layer 15 between the extension layer 11 and the compression layer 12. It is to be noted that the adhesive layer 15 is not essential but is provided for the purpose of enhancing adhesion among the load carrying cord 14, the extension layer 11, and the compression layer 12. The constitution may be a mode in which the load carrying cord 14 is embedded in the adhesive layer 15, or may be a mode in which the load carrying cord 14 is embedded between the compression layer 12 and the adhesive layer 15, in addition to the mode in which the load carrying cord 14 is embedded between the adhesive layer 15 and the extension layer 11 as in the present embodiment.

In addition, the V-ribbed belt 1 shown in FIG. 2 is constituted to include the extension layer 11, the adhesive layer 15 disposed in a lower layer of this extension layer 11, and the compression layer 12 disposed in a further lower layer thereof and formed of a rubber composition containing a short fiber 16. In other words, in the V-ribbed belt 1, the rubber layer is constituted of three layers including the extension layer 11, the adhesive layer 15 and the compression layer 12, and the compression layer 12 constitutes an internal layer. It is to be noted that it can be defined that the adhesive layer 15 and the compression layer 12 constitute an internal layer. In addition, the load carrying cord 14 is disposed so as to be embedded in a main body of the V-ribbed belt 1 along the V-ribbed belt longitudinal direction M and disposed in such a state that a half thereof is embedded in the extension layer 11, with the remaining half being embedded in the adhesive layer 15. Then, the compression layer 12 is provided with the plural ribs 13 having a cross section in a V-ribbed belt width direction N of a substantially trapezoidal shape and extending in the V-ribbed belt longitudinal direction M. Here, the short fiber 16 contained in the compression layer 12 is contained in a state of being oriented in the V-ribbed belt width direction N that is an orthogonal direction to the V-ribbed belt longitudinal direction M. In addition, the surface of the rib 13 is a polished surface.

Next, in order to explain specific shape and materials of the V-ribbed belt 1, each site and dimension of the V-ribbed belt 1 are defined as below by reference to FIG. 3 showing a simple cross-sectional view of the V-ribbed belt 1 in the V-ribbed belt width direction N. It is to be noted that the compression layer 12 is explained herein as one including the adhesive layer 15.

a: A distance from a load carrying cord center [2] to a V-ribbed belt back surface [1], which is corresponding to a thickness of the extension layer 11.

b: A distance from a load carrying cord bottom portion [3] corresponding to an outer peripheral portion of the load carrying cord 14 on the side of the rib 13 to the V-ribbed belt back surface [1].

c: A distance from a rib bottom portion [4] to the V-ribbed belt back surface [1].

d: A distance from a rib tip portion [5] to the V-ribbed belt back surface [1], which is corresponding to a thickness of the V-ribbed belt 1.

e: A width of the rib 13 in the V-ribbed belt width direction N, which is corresponding to a rib pitch.

f: A numerical value obtained by multiplying the rib pitch e by the number of ribs, which is corresponding to a width of the V-ribbed belt 1.

g: A length of an inclined plane of the rib 13 from the rib bottom portion [4] to the rib tip portion [5].

h: A distance from the rib bottom portion [4] to the load carrying cord bottom portion [3].

i: A distance from the rib tip portion [5] to the rib bottom portion [4], which is corresponding to a height of the rib 13.

j: A distance from the load carrying cord bottom portion [3] to the rib tip portion [5].

k: A distance from the rib tip portion [5] to the load carrying cord center [2], which is corresponding to a thickness of the compression layer 12.

In the V-ribbed belt 1 in the present embodiment, not only the distance j from the load carrying cord bottom portion [3] to the rib tip portion [5] is in the range of from 2.0 to 2.6 mm, but also the distance h from the load carrying cord bottom portion [3] to the rib bottom portion [4] is in the range of from 0.3 to 1.2 mm. According to this, by setting the distance j from the load carrying cord bottom portion [3] to the rib tip portion [5] to the range of from 2.0 to 2.6 mm, the thickness of the compression layer 12 can be made thin, and the torque loss can be reduced by making the stress (compressive stress) and internal loss of the compression layer 12 at the time of winding the V-ribbed belt 1 between the driving pulley 2 and the driven pulley 3 small. In addition, by setting the distance h from the load carrying cord bottom portion [3] to the rib bottom portion [4] to the range of from 0.3 to 1.2 mm, the torque loss can be reduced by making the bending stress of the load carrying cord 14 at the time of winding the V-ribbed belt 1 between the driving pulley 2 and the driven pulley 3 small (making the bending loss small).

When the distance j from the load carrying cord bottom portion [3] to the rib tip portion [5] is less than 2.0 mm, since the thickness of the compression layer 12 is excessively thin, there is a concern that the side pressure resistance against a pressing pressure from the driving pulley 2 and the driven pulley 3 is insufficient, so that the durability of the V-ribbed belt 1 is deteriorated, whereas when it is more than 2.6 mm, the thickness of the compression layer 12 becomes large, so that the torque loss of the V-ribbed belt 1 increases. It is to be noted that in the foregoing, though the distance j from the load carrying cord bottom portion [3] to the rib tip portion [5] is set to the range of from 2.0 to 2.6 mm, it may be more preferably set to the range of from 2.3 to 2.6 mm.

In addition, when the distance h from the load carrying cord bottom portion [3] to the rib bottom portion [4] is less than 0.3 mm, since a part of the load carrying cord 14 is exposed from the rib bottom portion [4] at the time of polishing to cause a defective appearance, or the layer of the rubber composition intervening between the load carrying cord 14 and the rib bottom portion [4] becomes extremely thin, a longitudinal crack (in the thickness direction of the V-ribbed belt 1) is easily generated in a valley bottom portion between the adjacent ribs 13, so that there is a concern that the V-ribbed belt is annularly broken along the V-ribbed belt longitudinal direction M. On the other hand, when it is more than 1.2 mm, the bending stress of the load carrying cord 14 when the V-ribbed belt 1 winds around the driving pulley 2 and the driven pulley 3 becomes large, so that the torque loss tends to increase. It is to be noted that the distance h from the load carrying cord bottom portion [3] to the rib bottom portion [4] is more preferably in the range of from 0.4 to 1.1 mm.

In addition, in the V-ribbed belt 1 in the present embodiment, the width of the rib (rib pitch e) is set to the range of from 2.0 to 3.0 mm, and the distance from the rib bottom portion [4] to the rib tip portion [5] (rib height i) is set to the range of from 1.1 to 1.8 mm. According to this, by setting the rib width (rib pitch e) and the distance from the rib bottom portion [4] to the rib tip portion [5] (rib height i) to ranges that are smaller than the conventional ones (those in Patent Document 2), the shape of the rib 13 that forms the compression layer 12 can be made small, and the torque loss can be reduced by making the internal loss to be caused due to compressive deformation of the rib 13 and the compressive stress of the rib 13 small.

What the distance from the rib bottom portion [4] to the rip tip portion [5] (rib height i) is made small decreases a contact area of the rib 13 with the driving pulley 2 and the driven pulley 3, resulting in lowering of transmission efficiency as described in paragraph [0004] of Patent Document 2. However, in the present embodiment, since the rib pitch e is made small, the number of ribs per width of the V-ribbed belt 1 can be increased, whereby the transmission efficiency can be kept. Though a numerical value obtained by multiplying the rib pitch e by the number of ribs becomes the width f of the V-ribbed belt 1, since the rib pitch e is made small, even when the number of ribs is increased, the width f of the V-ribbed belt 1 can be made small, and the torque loss can be reduced by making the bending loss of the belt small without lowering the above-described transmission efficiency.

When the rib width (rib pitch e) is less than 2.0 mm, the side pressure resistance of the rib 13 against a pressing pressure from the driving pulley 2 and the driven pulley 3 is insufficient, whereas when it is more than 3.0 mm, the shape of the rib 13 becomes large, and the stress and internal loss at the time of compressive deformation increases, so that the torque loss cannot be sufficiently reduced. It is to be noted that a preferred range of the rib pitch e is from 2.2 to 2.8 mm.

In addition, when the distance from the rib bottom portion [4] to the rip tip portion [5] (rib height i) is less than 1.1 mm, there is a concern that engagement of the rib 13 with grooves provided in the driving pulley 2 and the driven pulley 3 is insufficient, resulting in falling of the V-ribbed belt 1 from the driving pulley 2 and the driven pulley 3. On the other hand, when it is more than 1.8 mm, the shape of the rib 13 becomes large, and the torque loss increases. It is to be noted that the distance from the rib bottom portion [4] to the rib tip portion [5] (rib height i) is more preferably in the range of from 1.2 to 1.6 mm.

(Compression Layer 12)

As a rubber component of the rubber composition that forms the compression layer 12, vulcanizable or crosslinkable rubbers, for example, diene-based rubbers (e.g., natural rubber, isoprene rubber, butadiene rubber, chloroprene rubber, styrene-butadiene rubber (SBR), acrylonitrile butadiene rubber (nitrile rubber), hydrogenated nitrile rubber, etc.), ethylene-α-olefin elastomers, chlorosulfonated polyethylene rubbers, alkylated chlorosulfonated polyethylene rubbers, epichlorohydrin rubbers, acrylic rubbers, silicone rubbers, urethane rubbers, fluorine rubbers, and the like can be exemplified. These rubber components may be used solely or in combination of two or more kinds thereof. The rubber component is preferably an ethylene-α-olefin elastomer (ethylene-α-olefin-based rubber such as ethylene-propylene rubber (EPR), ethylene-propylene-diene monomer (EPDM), etc.), etc.) or chloroprene rubber. The rubber component is especially preferably a halogen-free ethylene-α-olefin elastomer which is excellent in durability as compared by chloroprene rubber. Examples of the diene monomer of EPDM include dicyclopentadiene, methylene norbornene, ethylidene norbornene, 1,4-hexadiene, cyclooctadiene, and the like.

In particular, when heat resistance or wear resistance is taken into consideration, EPDM that is a copolymer of ethylene, an α-olefin, and a non-conjugated diene is preferable, and above all, one having an ethylene content of from 51 to 68% by mass and a double bond (diene content) of from 0.2 to 7.5% by mass is preferable. As such EPDM, one having an iodine value of from 3 to 40 is preferably used. When the iodine value is less than 3, there is a concern that vulcanization of the rubber composition is not sufficient, resulting in the generation of a problem such as wear, adhesion, or sounding. In addition, when the iodine value is more than 40, there is a concern that scorch of the rubber composition is short, so that its handling becomes difficult, and heat resistance is deteriorated.

Energy that is applied on the occasion when the V-ribbed belt 1 is bent creates internal heat of the compressed rib rubber (compression layer 12) and becomes a cause of the torque loss. It is preferable to set the rubber composition that forms the compression layer 12 in such a manner that a content ratio of the ethylene-α-olefin elastomer in the rubber composition is 45% by mass or more, and a content ratio of carbon black is less than 35% by mass. A tan δ (loss tangent) of dynamic viscoelasticity of the compression layer 12 which is formed by curing the rubber composition can be lowered by making the content ratio of the ethylene-α-olefin elastomer high and making the content ratio of carbon black low. Then, in the case where the content ratio of the ethylene-α-olefin elastomer is 45% by mass or more and the content ratio of carbon black is less than 35% by mass, when the dynamic viscoelasticity of the compression layer which is formed by using this rubber composition is measured under conditions at an initial strain of 1.0%, a frequency of 10 Hz and a dynamic strain of 0.5%, a maximum value of the tan δ in the range of from 25 to 120° C. can be adjusted to less than 0.150. In the case where the content ratio of the ethylene-α-olefin elastomer is less than 45% by mass, or in the case where the content ratio of carbon black is 35% by mass or more, the tan δ becomes a large value as 0.150 or more, and the internal loss of the compressed rubber layer may possibly increase, whereby the torque loss becomes large.

Though an upper limit of the content ratio of the ethylene-α-olefin elastomer in the rubber composition is not particularly set, the content ratio of the ethylene-α-olefin elastomer is desirably not more than 55% by mass from the standpoint of practical use. In addition, though a lower limit of the content ratio of carbon black is not particularly set, when the content ratio of carbon black is less than 20% by mass, the wear resistance of the rubber composition is deteriorated and the durability of the V-ribbed belt 1 is lowered. Therefore, the content ratio of carbon black is desirably 20% by mass or more. In this way, when the content ratio of carbon black is made small, the durability tends to be lowered. Therefore, it is preferable to use graphite in combination, thereby making the content ratio of carbon black small while suppressing a lowering of the durability.

In addition, the rubber composition that forms the compression layer 12 may be blended with a material which is usually blended in rubber, for example, a crosslinking agent such as an organic peroxide, etc., a co-crosslinking agent such as N,N'-m-phenylene dimaleimide, a quinonedioxime, sulfur, etc., a vulcanization accelerator, a filler such as calcium carbonate, talc, etc., a plasticizer, a stabilizer, a processing aid, a coloring agent, a short fiber, or the like, as the need arises. As the short fiber, cotton, polyester (e.g., PET, PEN, etc.), nylon (e.g., 6 nylon, 66 nylon, 46 nylon, etc.), aramid (e.g., p-aramid or m-aramid), vinylon, and poly-p-phenylene benzobisoxazole (PBO) fibers, and the like can be used. These short fibers can be used solely or in combination of two or more kinds thereof. Then, these various blending materials can be molded in a sheet form by being kneaded by using usually adopted means with a Banbury mixer, a kneader, or the like.

(Rib 13)

As shown in FIG. 2, the plural ribs 13 extending parallel to each other along the V-ribbed belt longitudinal direction M are formed in the compression layer 12. Then, as shown in FIG. 4, an edge 13A of the tip potion of this rib 13 is formed in a sharp corner shape. In this way, since the edge 13A of the tip portion of the rib 13 is formed in a sharp corner shape, an area in which the rib 13 comes into contact with grooves of the driving pulley 2 and the driven pulley 3 can be made large, and a transmission performance can be kept.

In general, when the V-ribbed belt 1 winds around the driving pulley 2 and the driven pulley 3 to cause compressive deformation of the rib 13, the stress concentrates into the edge 13A of the tip portion of the rib 13. In such stress concentration, when the rib height i is large, a crack is easily generated from the tip portion of the rib 13. For that reason, as shown in FIG. 4, in a conventional V-ribbed belt (see, for example, JP-T-2007-509295), the contour shape of the edge of the tip portion of the rib was formed into a curved form for the purpose of preventing the generation of a crack from occurring. However, in the V-ribbed belt 1 according to the present embodiment, since the rib height i is set small, the stress against the edge 13A of the tip portion of the rib 13 on the occasion when the V-ribbed belt 1 is wound around the driving pulley 2 and the driven pulley 3 can be made very small, and therefore, it is not necessary to form the contour shape of the edge 13A of the tip portion of the rib 13 into a curved shape. That is, in the V-ribbed belt 1 according to the present embodiment, by forming the edge 13A of the tip portion of the rib 13 into a sharp corner shape, a contact area of the rib 13 with the grooves of the driving pulley 2 and the driven pulley 3 can be made large as compared with that in the conventional art in which the contour shape of the edge of the tip portion of the rib 13 is formed into a curved shape.

(Extension Layer 11)

As shown in FIG. 1, on the occasion when the V-ribbed belt 1 is wound between the driving pulley 2 and the driven pulley 3, the back surface side of the V-ridded belt 1 is stretched centering on the load carrying cord 14, and therefore, it is preferable that the extension layer 11 that forms the back surface side of the V-ribbed belt 1 is constituted of a rubber composition with a large elongation. Reasons why a rubber composition is used for the extension layer 11 in this way reside in the fact that since a conventional one prepared by laminating (coating) or imprinting (frictioning) a canvas with a rubber composition is smaller in elongation than a rubber composition simple substance, in order to bend the belt to stretch the extension layer, a larger force (tensile stress) is required, and when this tensile stress is high, a bending loss of the V-ribbed belt becomes large, resulting in an increase of the torque loss of an engine.

An elongation at break (corresponding to the longitudinal direction M of the V-ribbed belt 1) of the rubber composition that forms the extension layer 11 is preferably in the range of from 110 to 240%. When the elongation at break is less than 110%, the tensile stress of the extension layer 11 becomes high, resulting in an increase of the torque loss. On the other hand, when it is more than 240%, the hardness of the extension layer 11 is low, so that there is a concern that in the case of driving by the belt back surface (driving the pulleys by the back surface of the V-ribbed belt 1), the wear resistance is lowered to generate adhesive wear, or the load carrying cord 14 is exposed due to an advance of wear. It is to be noted that the elongation at break of the rubber composition was measured by a tensile testing method of rubber in conformity with JIS K6251-1993. Specifically, a sheet of 150×150×2 mm in thickness fabricated by subjecting a rubber composition to press vulcanization molding at 165° C. for 30 minutes was punched out into a dumbbell No. 5 form, thereby obtaining a test piece. The obtained test piece was measured by using a strograph, manufactured by Toyo Seiki Seisaku-Sho, Ltd.

In addition, a thickness of the extension layer 11 (the distance a from the load carrying cord center [2] to the V-ribbed belt back surface [1]) is set to preferably in the range of from 0.6 to 1.5 mm, more preferably in the range of from 0.7 to 1.3 mm, and still more preferably in the range of from 0.8 to 1.1 mm, and when it falls within this range, the torque loss can be effectively reduced by making the tensile stress of the extension layer 11 small. When the thickness of the extension layer 11 is less than 0.6 mm, there is a concern that the load carrying cord 14 is exposed due to an advance of wear, or a crack is generated in the extension layer 11, thereby causing cutting (annular breakage) of the V-ribbed belt 1 along the longitudinal direction M. On the other hand, when it is more than 1.5 mm, there is a concern that the tensile stress of the extension layer 11 becomes high, resulting in an increase of the torque loss.

In addition, the rubber composition that forms the extension layer 11 preferably contains the above-described short fiber blended therein, and the shape thereof may be in either a straight form or a form in which a part thereof is bent (for example, a milled fiber in JP-A-2007-120507). In the case where in the extension layer 11, a crack is generated in the V-ribbed belt longitudinal direction M at the time of running of the V-ribbed belt 1, by orienting the short fiber in the V-ribbed belt width direction N or random direction, it is possible to prevent annular breakage of the V-ridded belt 1 from occurring. It is to be noted that as for the rubber composition that forms the extension layer 11, though the same rubber composition as that in the above-described compression layer 12 can be used, a different rubber composition may also be used.

When the extension layer 11 is formed of a rubber composition, it is easily stretchable as compared with a conventionally used canvas, and a tensile stress of the extension layer 11 at the time when the V-ribbed belt 1 winds around the driving pulley 2 and the driven pulley 3 can be made small, whereby the torque loss can be reduced by making a bending loss of the V-ribbed belt 1 small.

(Adhesive Layer 15)

It is preferable that the adhesive layer 15 is formed by using, as the rubber composition, EPDM that is a copolymer of ethylene, an α-olefin and a non-conjugated diene, or a blend rubber prepared by mixing EPDM with a counter rubber made of another kind of rubber. As the counter rubber which is blended with EPDM that is a copolymer of ethylene, an α-olefin and a non-conjugated diene, at least one kind of rubbers selected from the group consisting of butadiene rubber (BR), styrene-butadiene rubber (SBR), nitrile rubber (NBR), hydrogenated nitrile rubber (H-NBR), chloroprene rubber (CR), butyl rubber (IIR), and natural rubber (NR) can be exemplified. It is to be noted that as described above, the adhesive layer 15 is not essential but is provided for the purpose of enhancing adhesion among the load carrying cord 14, the extension layer 11 and the compression layer 12. The constitution may be a mode in which the load carrying cord 14 is embedded in the adhesive layer 15, or may be a mode in which the load carrying cord 14 is embedded between the compression layer 12 and the adhesive layer 15, in addition to the mode in which the load carrying cord 14 is embedded between the adhesive layer 15 and the extension layer 11 as in the present embodiment.

(Load Carrying Cord 14)

The load carrying cord 14 is not particularly limited, but for example, a code which is formed of a polyester fiber such as a polybutylene terephthalate (PBT) fiber, a polyethylene terephthalate (PET) fiber, a polytrimethylene terephthalate (PTT) fiber, a polyethylene naphthalate (PEN) fiber, etc., a nylon fiber such as a 6 nylon fiber, a 66 nylon fiber, a 46 nylon fiber, etc., an aramid fiber such as a copoly-p-phenylene/3,4'-oxydiphenylene-terephthalamide fiber, a poly-p-phenylene terephthalamide fiber, etc., a polyarylate fiber, a glass fiber, a carbon fiber, a PBO fiber, or the like can be used. These fibers can be used solely or in combination of two or more kinds thereof.

It is preferable that the load carrying cord 14 is subjected to an adhesive treatment for the purpose of enhancing adhesion to the extension layer 11 and the compression layer 12. Such an adhesive treatment can be performed in such a manner that the load carrying cord 14 is dipped in a resin-based treatment liquid of an epoxy or isocyanate dissolved in an organic solvent and heated for drying, and thereafter, the resultant is dipped in a treatment liquid such as a resorcin-formalin-latex liquid (RFL liquid) and heated for drying. In addition, the load carrying cord 14 after the RFL treatment may be subjected to an overcoating treatment with a treatment liquid of a rubber composition dissolved in an organic solvent (e.g., toluene, xylene, methyl ethyl ketone, etc.), as the need arises.

A diameter of the load carrying cord 14 is preferably not more than 1.25 mm. When it is more than 1.25 mm, the bending stress of the load carrying cord itself becomes large, resulting in an increase of the torque loss of an engine, and hence, such is not preferable. The smaller the diameter of the load carrying cord 14, the lower the bending stress is. However, when the strength or modulus of the V-ribbed belt 1 is taken into consideration, a lower limit thereof is about 0.6 mm.

(Regarding Position of Load Carrying Cord 14)

On the occasion of winding the V-ribbed belt 1 between the driving pulley 2 and the driven pulley 3, so far as the distance h from the rib bottom portion [4] to the load carrying cord bottom portion [3] is concerned, when the case where the load carrying cord 14 is positioned on the pulley side (the side of the compression layer 12 of the V-ribbed belt 1) (a load carrying cord position A in FIG. 5) and the case where it is positioned more outside (a load carrying cord position B in FIG. 5) are compared, the torque loss is more reduced in the former (the load carrying cord position A) (see FIG. 5). This is because as shown in FIG. 5, when the V-ribbed belt 1 winds around the pulley, in the case where the position of the load carrying cord 14 is present on the pulley side, a thickness k of the compression layer 12 becomes thin ((a thickness k1 of the compression layer 12 at the load carrying cord position A)<(a thickness k2 of the compression layer 12 at the load carrying cord position B)), and a force (compression stress) required for bending the compression layer 12 becomes small. In addition, a winding length of the load carrying cord 14 against the pulley is shorter at the load carrying cord position A than that at the load carrying cord position B, and therefore, a force (bending stress) required for bending the load carrying cord 14 becomes small.

(Production Method of V-Ribbed Belt 1)

Next, an example of a method for producing the V-ribbed belt 1 is described.

First of all, prescribed amounts of the respective materials are mixed and subjected to rubber kneading by adopting a known method with a Banbury mixer or the like, thereby fabricating a rubber composition for forming the extension layer, a rubber composition for forming the compression layer, and a rubber composition for forming the adhesive layer. Each of the compositions is passed through calender rolls, thereby fabricating a extension layer forming sheet, a compression layer forming sheet, and an adhesive layer forming sheet each having a prescribed thickness.

Subsequently, the extension layer forming sheet (unvulcanized rubber sheet) is wound around a cylindrical molding mold having a flat surface, the load carrying cord 14 is subjected to spinning helically thereon, and furthermore, the adhesive layer forming sheet (unvulcanized rubber sheet) and the compression layer forming sheet (unvulcanized rubber sheet) are successively wound therearound, thereby fabricating a molded article.

Thereafter, the molded article is covered with a jacket for vulcanization from above, the resulting die is placed in a vulcanizer, and after performing vulcanization under a condition, for example, at a temperature of 160° C. for a time of 30 minutes, the resultant is removed from the molding mold, thereby obtaining a cylindrical vulcanized sleeve. Then, the outer surface of this vulcanized sleeve (corresponding to the compression layer 12) is polished with a grinding wheel to form the plural ribs 13, and thereafter, the resultant is cut into individual belts by using a cutter and finished into the V-ribbed belt 1.

It is to be noted that the distance h from the load carrying cord bottom portion [3] to the rib bottom portion [4] can be adjusted by changing the thickness of the compression layer forming sheet. The distance a from the load carrying cord center [2] to the V-ribbed belt back surface [1] can be adjusted by changing the thickness of the extension layer forming sheet. The rib pitch e that is a width of the rib 13 in the V-ribbed belt width direction N can be formed by using grinding wheels having a different size from each other and adjusting the size thereof (for example, 2.34 or 3.56 mm). The rib height i can be adjusted by using the above-described grinding wheels having a different size from each other (Examples 1 to 3 and Comparative Examples 1 to 3 as described later), or after polishing in a rib shape by using the above-described grinding wheels, the rib 13 is subjected to flat polishing (Example 4 as described later), whereby its size can be adjusted. The distance j from the rib tip portion [5] to the load carrying cord bottom portion [3] can be adjusted by changing the distance h from the load carrying cord bottom portion [3] to the rib bottom portion [4] and the rib height i as described above. The thickness of the adhesive layer forming sheet is set to, for example, 0.5 mm.

(Other Embodiments)

Examples of other embodiments of the V-ribbed belt of the present invention include V-ribbed belts shown in FIGS. 8 and 9.

Similar to the above-describe embodiment, a V-ribbed belt 21 shown in FIG. 8 is constituted to include a extension layer 11, an adhesive layer 15 disposed in a lower layer of this extension layer 11, and a compression layer 12 disposed in a further lower layer thereof and formed of a rubber composition containing a short fiber 16. In this V-ribbed belt 21, the rubber layer is also constituted of three layers including the extension layer 11, the adhesive layer 15, and the compression layer 12, and the compression layer 12 constitutes an internal layer. In addition, a load carrying cord 14 is disposed so as to be embedded in a main body of the V-ribbed belt 21 along a V-ribbed belt longitudinal direction M and disposed in such a state that a part thereof is embedded in the extension layer 11, with the remaining portion being embedded in the adhesive layer 15. Then, the compression layer 12 is provided with plural ribs 13 having a cross section in a V-ribbed belt width direction N of a substantially trapezoidal shape and extending in the V-ribbed belt longitudinal direction M. Then, as shown in FIG. 8, the short fiber 16 contained in the compression layer 12 of this V-ribbed belt 21 is contained in a state of being oriented so as to exhibit a fluidized state along the trapezoidal shape of the rib 13, and in the vicinity of the surface of the rib 13, the short fiber 16 is contained in a state of being oriented along the outer shape of the rib 13. Examples of a method for forming the rib 13 in which the short fiber 16 is oriented in this way include a method of press fitting the compression layer 12 into a die having the rib 13 engraved therein to from the rib 13.

In addition, a V-ribbed belt 31 shown in FIG. 9 may also be constituted to include an extension layer 11 and a compression layer 12 disposed in a lower layer of this extension layer 11 and formed of a rubber composition not containing a short fiber. In this V-ribbed belt 31, the rubber layer is constituted of two layers including the extension layer 11 and the compression layer 12, and the compression layer 12 constitutes an internal layer. In addition, a load carrying cord 14 is disposed so as to be embedded in a main body of the V-ribbed belt 31 along a V-ribbed belt longitudinal direction M and disposed in such a state that a part thereof is embedded in the extension layer 11, with the remaining portion being embedded in the compression layer 12. Then, the compression layer 12 is provided with plural ribs 13 having a cross section in a V-ribbed belt width direction N of a substantially trapezoidal shape and extending in the V-ribbed belt longitudinal direction M, and a short fiber 32 is flocked on the surface of each of the ribs 13.

EXAMPLES

In a V-ribbed belt, a comparative experiment of torque loss and a comparative experiment of transmission performance are described.

(Production of V-Ribbed Belt)

Materials described in a blending table of Table 1 were mixed and subjected to rubber kneading by adopting a known method with a Banbury mixer or the like, thereby fabricating a rubber composition for forming an extension layer, a rubber composition for forming a compression layer and a rubber composition for forming an adhesive layer. Each of the compositions was passed through calender rolls, thereby fabricating a extension layer forming sheet, a compression layer forming sheet and an adhesive layer forming sheet each having a prescribed thickness.

Subsequently, the extension layer forming sheet (unvulcanized rubber sheet) was wound around a cylindrical molding mold having a flat surface, load carrying cord 14 was subjected to spinning helically thereon, and furthermore, the adhesive layer forming sheet (unvulcanized rubber sheet) and the compression layer forming sheet (unvulcanized rubber sheet) were successively wound therearound, thereby fabricating a molded article. Thereafter, the molded article was covered with a jacket for vulcanization from above, and the resulting die was placed in a vulcanizer, and after performing vulcanization under a condition at a temperature of 160° C. for a time of 30 minutes, the resultant was removed from the molding mold, thereby obtaining a cylindrical vulcanized sleeve. Then, the outer surface of this vulcanized sleeve was polished with a grinding wheel to form plural ribs, and thereafter, the resultant was cut into individual belts by using a cutter and finished into a V-ribbed belt.

It is to be noted that in respective Examples and Comparative Examples, the thickness of each of the extension layer forming sheet and the compression layer forming sheet was adjusted such that each of dimensions of the obtained V-ribbed belts became a value as described later. The thickness of the adhesive layer forming sheet was fixed at 0.5 mm.

TABLE 1

| Material | Rubber composition for forming extension layer and rubber composition for forming compression layer | Rubber composition for forming adhesive layer |
|---|---|---|
| EPDM polymer | 100 | 100 |
| Nylon short fiber | 20 | 0 |
| Cotton short fiber | 20 | 0 |
| Zinc oxide | 5 | 5 |
| Stearic acid | 1 | 1 |
| Carbon black | 50 | 35 |
| Hydrated silica | 0 | 20 |
| Paraffin-based oil | 10 | 0 |
| Resorcin-formalin copolymer | 0 | 2 |
| Antioxidant | 2 | 2 |
| Organic peroxide | 2 | 0 |
| Sulfur | 0 | 1 |
| Vulcanization accelerator | 0 | 2 |
| Hexamethoxymethylol melamine | 0 | 2 |
| Co-crosslinking agent | 2 | 0 |
| Total | 212 | 170 |

*: The unit is a part by mass, (Dimension of V-Ribbed Belts According to Examples and Comparative Examples)

As shown in Table 2, the fabricated V-ribbed belts are at 7 standards including the Examples and Comparative Examples. It is to be noted that as for the dimension measurement of the V-ribbed belts according to the following Examples and Comparative Examples, the V-ribbed belt was cut in a parallel direction to the V-ribbed belt width direction N, and this cut surface was subjected to magnification observation with a scanning electron microscope ("JSM5900LV", manufactured by JEOL Ltd.), thereby measuring the dimension of each site of the V-ribbed belt.

A V-ribbed belt according to Example 1 has a distance a from the load carrying cord center [2] to the V-ribbed belt back surface [1] of 0.80 mm, a distance b from the load carrying cord bottom portion [3] to the V-ribbed belt back surface [1] of 1.20 mm, a distance c from the rib bottom portion [4] to the V-ribbed belt back surface [1] of 2.30 mm, a distance d from the rib tip portion [5] to the V-ribbed belt back surface [1] of 3.80 mm, a rib pitch e of 2.34 mm, a width f of the V-ribbed belt of 18.72 mm, a distance h from the load carrying cord bottom portion [3] to the rib bottom portion [4] of 1.10 mm, a distance i from the rib tip portion [5] to the rib bottom portion [4] of 1.50 mm, and a distance j from the rib tip portion [5] to the load carrying cord bottom portion [3] of 2.60 mm.

A V-ribbed belt according to Example 2 has a distance a from the load carrying cord center [2] to the V-ribbed belt back surface [1] of 1.30 mm, a distance b from the load carrying cord bottom portion [3] to the V-ribbed belt back surface [1] of 1.90 mm, a distance c from the rib bottom portion [4] to the V-ribbed belt back surface [1] of 2.30 mm, a distance d from the rib tip portion [5] to the V-ribbed belt back surface [1] of 4.30 mm, a rib pitch e of 3.56 mm, a width f of the V-ribbed belt of 21.36 mm, a distance h from the load carrying cord bottom portion [3] to the rib bottom portion [4] of 0.40 mm, a distance i from the rib tip portion [5] to the rib bottom portion [4] of 2.00 mm, and a distance j from the rib tip portion [5] to the load carrying cord bottom portion [3] of 2.40 mm.

A V-ribbed belt according to Example 3 has a distance a from the load carrying cord center [2] to the V-ribbed belt back surface [1] of 1.10 mm, a distance b from the load carrying cord bottom portion [3] to the V-ribbed belt back surface [1] of 1.50 mm, a distance c from the rib bottom portion [4] to the V-ribbed belt back surface [1] of 2.30 mm, a distance d from the rib tip portion [5] to the V-ribbed belt back surface [1] of 3.80 mm, a rib pitch e of 2.34 mm, a width f of the V-ribbed belt of 18.72 mm, a distance h from the load carrying cord bottom portion [3] to the rib bottom portion [4] of 0.80 mm, a distance i from the rib tip portion [5] to the rib bottom portion [4] of 1.50 mm, and a distance j from the rib tip portion [5] to the load carrying cord bottom portion [3] of 2.30 mm.

A V-ribbed belt according to Example 4 has a distance a from the load carrying cord center [2] to the V-ribbed belt back surface [1] of 0.80 mm, a distance b from the load carrying cord bottom portion [3] to the V-ribbed belt back surface [1] of 1.20 mm, a distance c from the rib bottom portion [4] to the V-ribbed belt back surface [1] of 2.30 mm, a distance d from the rib tip portion [5] to the V-ribbed belt back surface [1] of 3.50 mm, a rib pitch e of 2.34 mm, a width f of the V-ribbed belt of 18.72 mm, a distance h from the load carrying cord bottom portion [3] to the rib bottom portion [4] of 1.10 mm, a distance i from the rib tip portion [5] to the rib bottom portion [4] of 1.20 mm, and a distance j from the rib tip portion [5] to the load carrying cord bottom portion [3] of 2.30 mm.

A V-ribbed belt according to Comparative Example 1 has a distance a from the load carrying cord center [2] to the V-ribbed belt back surface [1] of 1.00 mm, a distance b from the load carrying cord bottom portion [3] to the V-ribbed belt back surface [1] of 1.60 mm, a distance c from the rib bottom portion [4] to the V-ribbed belt back surface [1] of 2.30 mm, a distance d from the rib tip portion [5] to the V-ribbed belt back surface [1] of 4.30 mm, a rib pitch e of 3.56 mm, a width f of the V-ribbed belt of 21.36 mm, a distance h from the load carrying cord bottom portion [3] to the rib bottom portion [4] of 0.70 mm, a distance i from the rib tip portion [5] to the rib bottom portion [4] of 2.00 mm, and a distance j from the rib tip portion [5] to the load carrying cord bottom portion [3] of 2.70 mm.

A V-ribbed belt according to Comparative Example 2 has a distance a from the load carrying cord center [2] to the V-ribbed belt back surface [1] of 1.00 mm, a distance b from the load carrying cord bottom portion [3] to the V-ribbed belt back surface [1] of 1.60 mm, a distance c from the rib bottom portion [4] to the V-ribbed belt back surface [1] of 2.80 mm, a distance d from the rib tip portion [5] to the V-ribbed belt back surface [1] of 4.30 mm, a rib pitch e of 2.34 mm, a width f of the V-ribbed belt of 18.72 mm, a distance h from the load carrying cord bottom portion [3] to the rib bottom portion [4] of 1.20 mm, a distance i from the rib tip portion [5] to the rib bottom portion [4] of 1.50 mm, and a distance j from the rib tip portion [5] to the load carrying cord bottom portion [3] of 2.70 mm.

A V-ribbed belt according to Comparative Example 3 has the same constitution as that in the V-ribbed belt of Comparative Example 1, except for changing the width f of the V-ribbed belt to 28.48 mm.

TABLE 2

| | Belt dimension | Example 1 | Example 2 | Example 3 | Example 4 | Comparative Example 1 | Comparative Example 2 | Comparative Example 3 |
|---|---|---|---|---|---|---|---|---|
| a | From load carrying cord center [2] to V-ribbed belt back surface [1] | 0.80 | 1.30 | 1.10 | 0.80 | 1.00 | 1.00 | 1.00 |
| b | From load carrying cord bottom portion [3] to V-ribbed belt back surface [1] | 1.20 | 1.90 | 1.50 | 1.20 | 1.60 | 1.60 | 1.60 |
| c | From rib bottom portion [4] to V-ribbed belt back surface [1] | 2.30 | 2.30 | 2.30 | 2.30 | 2.30 | 2.80 | 2.30 |
| d | From rib tip portion [5] to V-ribbed belt back surface [1] | 3.80 | 4.30 | 3.80 | 3.50 | 4.30 | 4.30 | 4.30 |
| e | Width of rib (rib pitch) | 2.34 | 3.56 | 2.34 | 2.34 | 3.56 | 2.34 | 3.56 |
| f | Width of V-ribbed belt | 18.72 | 21.36 | 18.72 | 18.72 | 21.36 | 18.72 | 28.48 |
| h | From rib bottom portion [4] to load carrying cord bottom portion [3] | 1.10 | 0.40 | 0.80 | 1.10 | 0.70 | 1.20 | 0.70 |
| i | From rib tip portion [5] to rib bottom portion [4] | 1.50 | 2.00 | 1.50 | 1.20 | 2.00 | 1.50 | 2.00 |
| j | From load carrying cord bottom portion [3] to rib tip portion [5] | 2.60 | 2.40 | 2.30 | 2.30 | 2.70 | 2.70 | 2.70 |

*: The unit is mm.

(Measuring Method of Torque Loss)

Next, a method for measuring the torque loss is described. As shown in FIG. 6(a), the V-ribbed belt was wound around a biaxial running test machine constituted of a driving (Dr.) pulley having a diameter of 55 mm and a driven (Dn.) pulley having a diameter of 55 mm, a prescribed initial tension was given in a tension range of from 450 to 950 N per belt to the V-ribbed belt, and the driving pulley was rotated at 2,000 rpm without applying a load to the driven pulley. At that time, a difference between a driving torque and a driven torque was calculated as the torque loss. It is to be noted that the torque loss which is determined by this measurement also includes a torque loss to be caused due to a bearing of the test machine in addition to the torque loss due to a bending loss of the V-ribbed belt. For that reason, a metal belt (material: maraging steel) in which a torque loss as a V-ribbed belt is considered to be substantially 0 was previously run; at that time, a difference between a driving torque and a driven torque was considered to be a torque loss (bearing loss) to be caused due to the bearing; and a value obtained by subtracting the torque loss to be caused due to the bearing from the torque loss calculated upon running of the V-ribbed belt (torque loss to be caused due to the two of the V-ribbed belt and the bearing) was determined as the torque loss to be caused due to the V-ribbed belt itself. Here, the torque loss to be subtracted (bearing loss) is a torque loss when the metal belt is run at a prescribed initial tension (for example, in the case of running the V-ribbed belt at an initial tension of 500 N per belt, a torque loss at the time of running the metal belt at this initial tension). It is meant that the smaller the torque loss of this V-ribbed belt, the more excellent the fuel consumption saving properties are.

(Measurement Results of Torque Loss)

A relation between the torque loss and the belt tension was shown in FIG. 7. In the V-ribbed belts of Examples 1 to 4, the torque loss versus the belt tension changes at lower levels as compared with those of Comparative Examples 1 and 2, and hence, it is understood that excellent fuel consumption saving properties are revealed. When Examples 1 to 4 are compared, in Example 4 in which the rib height i was made small, the torque loss was the lowest, whereas in Example 2 in which the rib height i was made large, the torque loss was the highest. In addition, when Example 1 and Example 3 in which the rib height i was equal are compared, Example 3 was smaller in the torque loss. It may be considered that this was caused due to the fact that in Example 3, the distance j from the rib tip portion [5] to the load carrying cord bottom portion [3] (the distance h from the load carrying cord bottom portion [3] to the rib bottom portion [4]) was smaller by 0.30 mm than that in Example 1.

(Measuring Method of Transmission Performance)

Figure 6B:
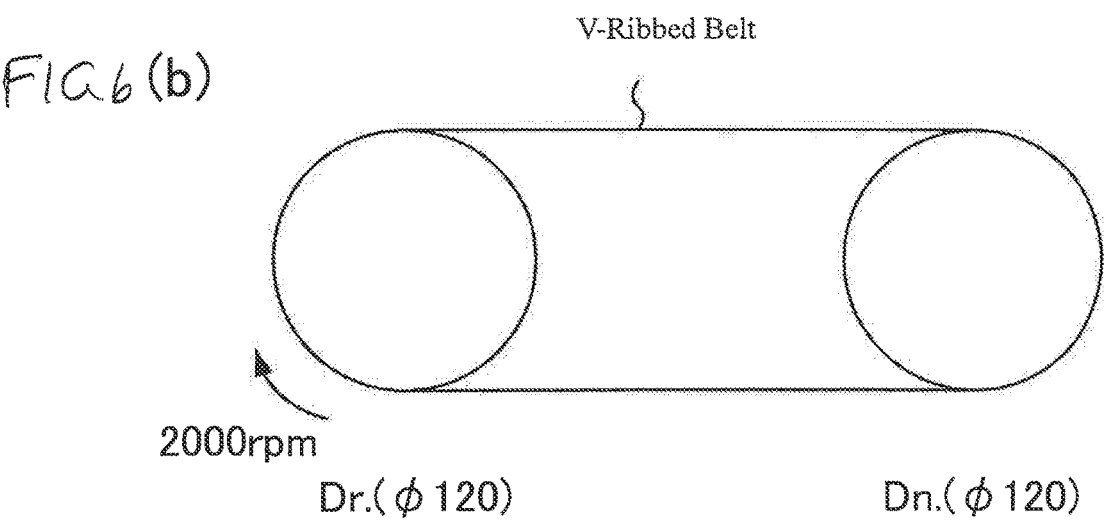

Next, a method for measuring the transmission performance is described. As shown in FIG. 6(b), the V-ribbed belt was wound around a biaxial running test machine constituted of a driving (Dr.) pulley having a diameter of 120 mm and a driven (Dn.) pulley having a diameter of 120 mm, an initial tension (three levels of 329, 400 and 526 N per belt) was given to the V-ribbed belt. Thereafter, a load (driven torque) of the driven pulley was increased at a rotation rate of the driving pulley of 2,000 rpm under a condition of a room temperature environment, and when a slip rate of the V-ribbed belt relative to the driven pulley reached 2%, the driven torque was measured. It is meant that the higher the numerical value of the driven torque, the more excellent the transmission performance of the V-ribbed belt is.

(Measurement Results of Transmission Performance)

In order to examine influences of the rib height i against the transmission performance, the V-ribbed belts of Example 1 (1.50 mm) and Comparative Example 3 (2.00 mm) having a different rib height i from each other were measured for the transmission performance. It is to be noted that so long as the rubber composition of the compression layer 12 is equal, the transmission performance depends upon the rib height i and the number of ribs. In consequence, it can be considered that Examples 1 and 3 and Comparative Example 2 have a transmission performance of the same degree. In addition, Example 2 and Comparative Example 1 are also at the same degree. The measurement results were shown in Table 3. The results reveal that the driven torque at the time of slipping with 2% in Example 1 was slightly smaller than that in Comparative Example 3. This is because the V-ribbed belt width f in Example 1 is smaller than that in Comparative Example 3. When this driven torque is converted into one per cm of the belt width and compared, the driven torque in Example 1 was higher than that in Comparative Example 3. This is because the rib pitch e was made small to make the number of ribs per unit width of the V-ribbed belt large. Specifically, the number of ribs per cm of the V-ribbed belt width (1 cm per the rib pitch e) is 4.3 in Example 1 and 2.8 in Comparative Example 3, respectively. It is understood that even if the rib height i is made small, by making the rib pitch e small to make the number of ribs per unit width of the V-ribbed belt large, the transmission performance can be kept.

TABLE 3

|  | Example 1 | Comparative Example 3 |
| --- | --- | --- |
| Rib pitch e (mm) | 2.34 | 3.56 |
| Rib height i (mm) | 1.50 | 2.00 |
| Number of ribs | 8 | 8 |
| Belt width f (mm) | 18.72 | 28.48 |
| Driven torque (N · m) | | |
| Tension (N/belt) | | |
| 329 | 43.1 | 46.7 |
| 400 | 49.2 | 53.4 |
| 526 | 61.5 | 63.8 |
| Driven torque (N · m/cm) | | |
| Tension (N/belt) | | |
| 329 | 23.0 | 16.4 |
| 400 | 26.3 | 18.8 |
| 526 | 32.9 | 22.4 |

While the present invention has been described in detail and with reference to specific embodiments thereof, it will be apparent to one skilled in the art that various changes and modifications can be made therein without departing from the spirit and scope thereof.

The present application is based on Japanese Patent Application No. 2012-018630 filed on Jan. 31, 2012 and Japanese Patent Application No. 2013-007469 filed on Jan. 18, 2013, and the contents thereof are incorporated herein by reference.

DESCRIPTION OF REFERENCE NUMERALS AND SIGNS 1, 21, 31: V-Ribbed belt
1A: V-Ribbed belt back surface
2: Driving pulley
3: Driven pulley
11: Extension layer
12: Compression layer
13: Rib
13A: Edge
14: Load carrying cord
15: Adhesive layer
16, 32: Short fiber
M: V-Ribbed belt longitudinal direction
N: V-Ribbed belt width direction

The invention claimed is:

1. A V-ribbed belt having an inside and an outside, the V-ribbed belt comprising:
   an extension layer that forms a back surface of the V-ribbed belt,
   a compression layer provided on one surface of the extension layer and having plural ribs extending parallel to each other along a longitudinal direction of the V-ribbed belt, and
   a load carrying cord embedded between the extension layer and the compression layer along the longitudinal direction of the V-ribbed belt,
   the load cord having an outer peripheral portion with a rib side and an opposite side spaced from each other in a direction between the inside and outside of the V-ribbed belt,
   wherein a distance from the outer peripheral portion of the load carrying cord on the rib side to a tip portion of the rib is from 2.0 to 2.6 mm, and a distance from the outer peripheral portion of the load carrying cord on the rib side to a bottom portion of the rib is from 0.3 to 1.2 mm.

2. The V-ribbed belt according to claim 1, wherein a width of the rib is from 2.0 to 3.0 mm and a distance from the bottom portion of the rib to the tip portion of the rib is from 1.1 to 1.8 mm.

3. The V-ribbed belt according to claim 1, wherein a distance from a center of the load carrying cord to the back surface of the V-ribbed belt is from 0.6 to 1.5 mm.

4. The V-ribbed belt according to claim 1, wherein a diameter of the load carrying cord is from 0.6 to 1.25 mm.

5. The V-ribbed belt according to claim 1, wherein an edge of the tip potion of the rib is a sharp corner shape.

6. The V-ribbed belt according to claim 1, wherein the extension layer is formed of a rubber composition.

* * * * *